(12) United States Patent
Cioffi et al.

(10) Patent No.: US 9,685,904 B2
(45) Date of Patent: Jun. 20, 2017

(54) PHOTOVOLTAIC SYSTEM WITH IMPROVED DC CONNECTIONS AND METHOD OF MAKING SAME

(71) Applicant: General Electric Company, Schenectady, NY (US)

(72) Inventors: Philip Michael Cioffi, Schaghticoke, NY (US); Maja Harfman Todorovic, Niskayuna, NY (US); Michael Scott Herzog, Voorheesville, NY (US); Charles Steven Korman, Niskayuna, NY (US); Donald M. Doherty, Schenectady, NY (US); Neil Anthony Johnson, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 750 days.

(21) Appl. No.: 14/055,024

(22) Filed: Oct. 16, 2013

(65) Prior Publication Data
US 2015/0101653 A1    Apr. 16, 2015

(51) Int. Cl.
*H02S 30/10* (2014.01)
*H02S 40/30* (2014.01)
*H02S 40/32* (2014.01)
*H01L 31/02* (2006.01)
*H02S 40/34* (2014.01)
*H02S 20/00* (2014.01)

(52) U.S. Cl.
CPC .............. *H02S 40/34* (2014.12); *H02S 20/00* (2013.01); *H02S 40/32* (2014.12); *Y02E 10/50* (2013.01); *Y10T 29/49117* (2015.01)

(58) Field of Classification Search
CPC ........... H02S 30/10; H02S 40/30; H02S 40/32
See application file for complete search history.

(56) References Cited

U.S. PATENT DOCUMENTS

| 7,819,114 | B2 | 10/2010 | Augenbraun et al. | |
|---|---|---|---|---|
| 8,371,076 | B2 | 2/2013 | Jones et al. | |
| 2009/0000654 | A1* | 1/2009 | Rotzoll | H02M 7/493 |
| | | | | 136/244 |
| 2009/0293863 | A1 | 12/2009 | Augenbraun et al. | |

(Continued)

FOREIGN PATENT DOCUMENTS

WO    2010144637 A1    12/2010

OTHER PUBLICATIONS

"Microinverters Solar Micro-inverters," Green Energy Options, accessed May 30, 2013, pp. 1-3.

(Continued)

*Primary Examiner* — Susan D Leong
(74) *Attorney, Agent, or Firm* — Ziolkowski Patent Solutions Group, SC; Jean K. Testa

(57) ABSTRACT

A micro-inverter assembly includes a housing having an opening formed in a bottom surface thereof, and a direct current (DC)-to-alternating current (AC) micro-inverter disposed within the housing at a position adjacent to the opening. The micro-inverter assembly further includes a micro-inverter DC connector electrically coupled to the DC-to-AC micro-inverter and positioned within the opening of the housing, the micro-inverter DC connector having a plurality of exposed electrical contacts.

9 Claims, 15 Drawing Sheets

(56) References Cited

U.S. PATENT DOCUMENTS

| | | | |
|---|---|---|---|
| 2009/0314335 A1* | 12/2009 | McClintock | F24J 2/5211 |
| | | | 136/251 |
| 2012/0024563 A1* | 2/2012 | Korman | H02S 40/32 |
| | | | 174/51 |
| 2012/0031470 A1 | 2/2012 | Dimov et al. | |
| 2012/0125399 A1 | 5/2012 | Schatz et al. | |
| 2012/0175322 A1 | 7/2012 | Park et al. | |
| 2012/0240490 A1 | 9/2012 | Gangemi | |
| 2013/0014455 A1 | 1/2013 | Grieco | |

OTHER PUBLICATIONS

Enphase Engage Cable and Accessories Installation Manual, Enphase Energy, Inc. Petaluma, CA, 2011, pp. 1-28.
IM60+ Series Photovoltaic Modules, Motech Industries, Inc. Solar Division, Tainan City, Taiwan, Jun. 2012, pp. 1-2.

* cited by examiner

PHOTOVOLTAIC SYSTEM WITH IMPROVED DC CONNECTIONS AND METHOD OF MAKING SAME

GOVERNMENT LICENSE RIGHTS

This invention was made with Government support under contract number DE-EE0005344 awarded by the United States Department of Energy. The Government has certain rights in the invention.

BACKGROUND OF THE INVENTION

Embodiments of the invention relate generally to photovoltaic (PV) systems and more particularly to improved systems and methods for forming direct current (DC) electrical connections between a DC connector of a PV panel to a DC connector of a DC-to-alternating current (AC) micro-inverter and AC electrical connections between the micro-inverter and AC wiring harness of the PV system.

PV systems include PV modules arranged in arrays that generate direct current (DC) power, with the level of DC current being dependent on solar irradiation and the level of DC voltage dependent on temperature. PV systems may be constructed either as an inverter system or a micro-inverter system. A typical inverter system uses DC wiring to electrically couple multiple PV panels to a single inverter. The inverter then converts the DC energy from the PV panels into AC energy, such as AC energy suitable for transfer to a power grid. A typical micro-inverter system, on the other hand, uses DC wiring and a junction box to electrically connect a micro-inverter to each PV panel, forming an AC PV module 300 as shown in FIG. 1. In this AC PV module system, each micro-inverter 306 converts the DC energy from its respective PV panel into AC energy suitable for transfer to a power grid. The junction box 308 of each PV module 300 contains bypass diodes that allow each AC PV module 300 to maintain peak efficiency under partial shading conditions by bypassing sections of cells in the AC PV module 300 which are not receiving solar irradiation. By removing AC PV module cells that are not producing DC power from the electrical connection, the PV system ensures that these non-producing AC PV module cells do not draw DC power from the PV system, which may reduce power to the load and cause AC PV module overheating.

The construction of typical AC PV modules makes infield repairs time consuming. In the case of an internal wiring issue, a technician must diagnose the fault onsite in order to determine what component of the module to repair. An electrical fault may occur within the micro-inverter assembly itself 302, which is secured to a PV panel 304, the diodes within junction box 308, or between the two (2) DC connections 310, 312 that contain respective DC connectors 314, 316 that connect the junction box 308 and the micro-inverter 306. Since a unique key or tool must be used to the remove each of the junction box 308, the micro-inverter 306, and to disassemble the DC connectors 314, 316, each component to determine which component of the AC PV module 300 is faulty, the onsite repair is time consuming and costly. Further, the wired connection between the PV panel 304 and the micro-inverter typically includes approximately one to two feet of DC cable and a junction box, which adds cost to the PV system.

To meet the national electrical code (NEC), special DC wiring and grounding specifications exist for DC module strings capable of producing voltages as high as 600 volts. Further, installers must properly manage the safety risks posed by the potentially lethal DC voltages when dealing with installation of DC wiring. As a result, a certified electrician is used for proper installation of the special DC wiring. Because all of the wiring is done on-site, the process for installing the DC wiring of the PV system accounts for a significant amount of the time and cost of the overall installation of the PV system.

AC PV modules are electrically connected together in groups to form multiple circuits within a PV system 322, as shown in FIG. 2. The PV system 322 of FIG. 2 includes a first row 324 of AC PV modules 326 and a second row 328 of AC PV modules 326. An AC wire harness 334 is used to electrically couple AC PV modules 326 to a single AC power output. An AC wire harness 334 is used to electrically connect the AC PV modules within a given circuit to a single AC power output and includes a termination point 330 on one end and a connection point 338 on a second end to connect AC wire harness 334 to the another AC wire harness or the load panel. In installations where the AC PV modules of a given circuit are arranged in multiple rows 324, 328, the AC wire harness is typically arranged to travel down a length of one of the rows of AC PV modules along a first side of a mounting rail, loop around the end of the mounting rail between the adjacent rows of AC PV modules, and then travel down the length of the next row of PV modules along a second side of the mounting rail. Therefore, AC wire harness 334 may be twice as long as rail 332 in order to fully track both sides of rail 332 and connect all AC PV modules 326. Separate AC connections 336 are positioned along the length of the AC wire harness 334 to connect to each PV module 326. Over the length of the AC wire harness 334, power is lost due to cable resistance, which results in lower efficiencies for PV systems with long wire harnesses. This also results in a voltage drop along the length of the AC wire harness. If the AC wire harness 334 is too long, the resulting voltage drop will put the electrical circuit outside of its operating specifications and cause the micro-inverters to turn off, in order to comply with UL safety code. Further, resistance at each connection point along the length of the AC wire harness also results in power loss, and a decrease in efficiency for the PV system.

Therefore, it would be desirable to provide a PV system with DC connections that are easily field repairable, have a reliable and stable connection, and are less costly than the DC connections of known PV systems. It would likewise be desirable to provide an AC wire harness that improves the efficiency of the PV system while decreasing overall costs of the system. It would further be desirable for such a PV system to be manufactured in a manner that reduces the time, cost, and dangers of on-site installation of the PV system.

BRIEF DESCRIPTION OF THE INVENTION

In accordance with one aspect of the invention, a micro-inverter assembly includes a housing having an opening formed in a bottom surface thereof, and a direct current (DC)-to-alternating current (AC) micro-inverter disposed within the housing at a position adjacent to the opening. The micro-inverter assembly further includes a micro-inverter DC connector electrically coupled to the DC-to-AC micro-inverter and positioned within the opening of the housing, the micro-inverter DC connector having a plurality of exposed electrical contacts.

In accordance with another aspect of the invention, a method of assembling a photovoltaic (PV) module includes providing a PV panel and coupling a first direct current (DC)

connector to a bottom surface of the PV panel, the first DC connector having a plurality of leads electrically coupled to the PV panel. The method further includes providing a micro-inverter assembly, the micro-inverter assembly having a micro-inverter positioned within a housing and a second DC connector electrically coupled to the micro-inverter and positioned within a recess formed in a bottom surface of the housing. In addition, the method includes positioning the bottom surface of the housing on the bottom surface of the PV panel at a first position, wherein the first DC connector is positioned within the recess, and moving the housing from the first position to a second position, wherein movement from the first position to the second position causes the first DC connector to engage the second DC connector.

In accordance with yet another aspect of the invention, a photovoltaic (PV) module assembly includes a PV panel, a panel direct current (DC) connector coupled to an inactive side of the PV panel, and a micro-inverter assembly. The micro-inverter assembly includes a housing, a micro-inverter disposed within the housing, and a micro-inverter DC connector positioned within the housing and coupled to the micro-inverter. Further, the panel DC connector and the micro-inverter DC connector have mating connectors disposed within a recess formed in the housing.

These and other advantages and features will be more readily understood from the following detailed description of preferred embodiments of the invention that is provided in connection with the accompanying drawings.

BRIEF DESCRIPTION OF THE DRAWINGS

The drawings illustrate embodiments presently contemplated for carrying out the invention.

In the drawings.

DETAILED DESCRIPTION

Figure 1:
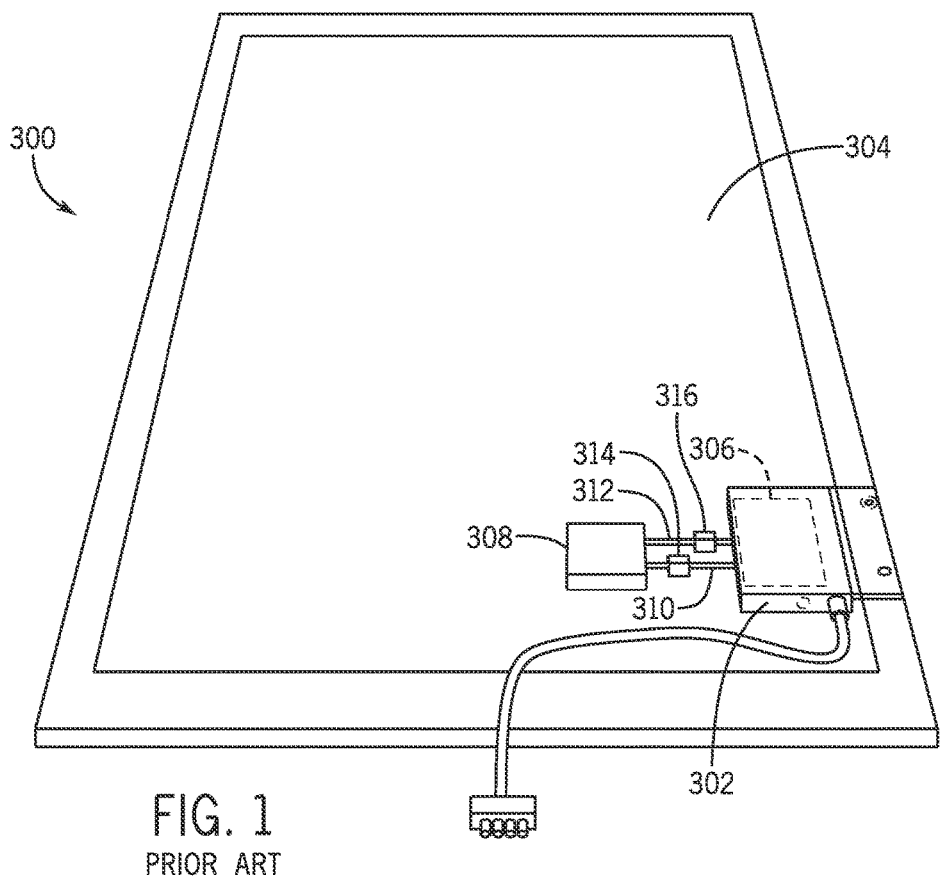
FIG. 1 is a perspective view of the inactive side of the inactive side of a prior art AC PV module.
Figure 2:
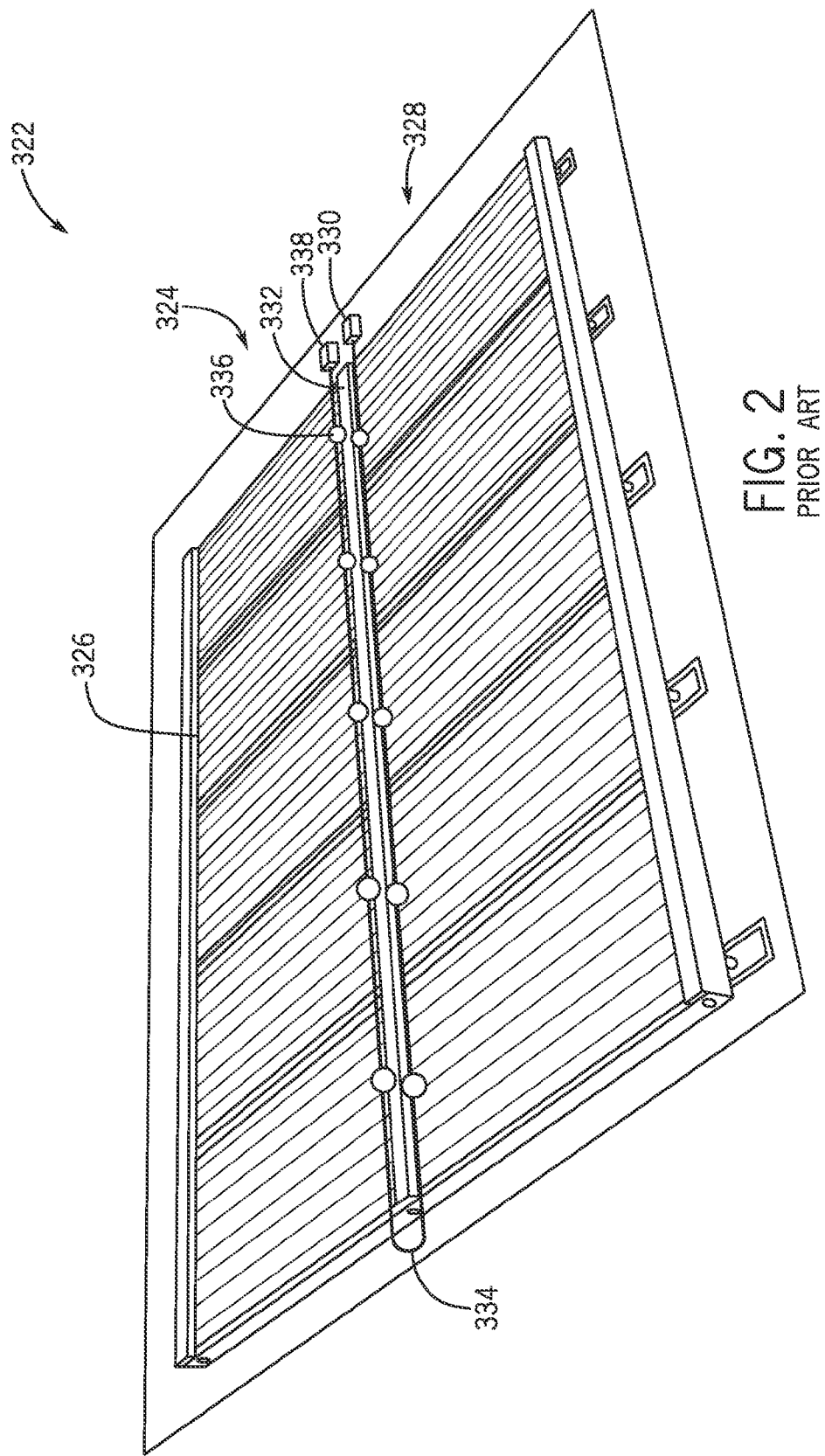
FIG. 2 is a perspective view of a prior art PV system.
Figure 3:
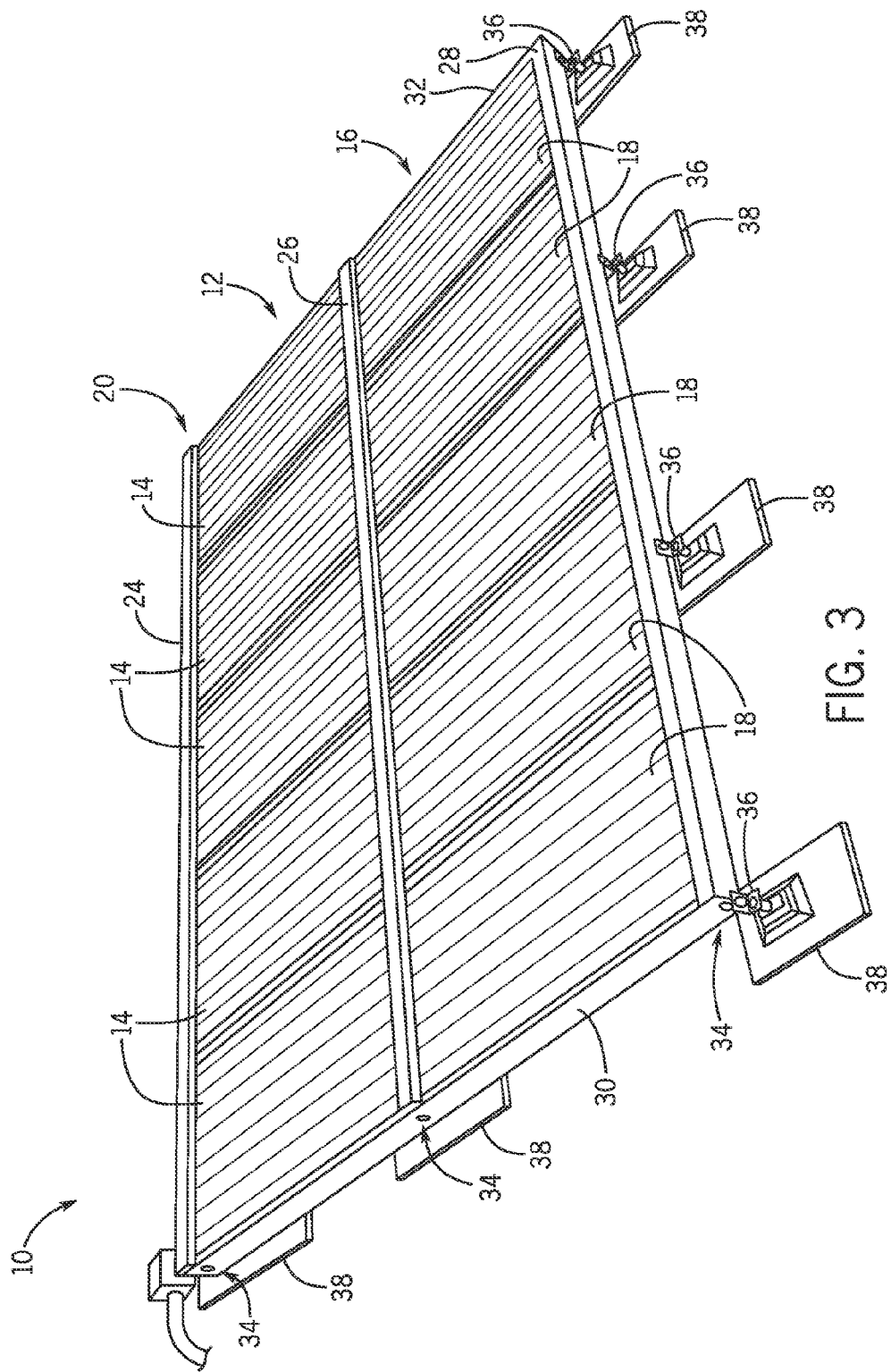
FIG. 3 is a front perspective view of a photovoltaic (PV) system, according to an embodiment of the invention.

Referring now to FIG. 3, a PV system 10 is illustrated according to an embodiment of the invention. PV system 10 includes a first row 12 containing at least one AC PV module 14 and a second row 16 containing at least one AC PV module 18, and a rail system 20 that includes a number of support bars, as described in detail below. In the embodiment shown in FIG. 3, the first row 12 of PV system 10 includes five (5) AC PV modules 14, and the second row 16 of PV system 10 includes five (5) AC PV modules 18. However, one skilled it the art will appreciate that embodiments of the invention are not limited to rows 12, 16 having a particular number of AC PV modules 14, 18. Thus, according to alternative embodiments, rows 12, 16 may include any desirable number of AC PV modules 14, 18 depending on design specifications and applicable limitations imposed by the National Electrical Code (NEC). Further, PV system 10 may have more or less than two (2) rows of AC PV modules, according to alterative embodiments.

Rail system 20 of PV system 10 has an asymmetric design that allows n rows of AC PV modules 14, 18 to be supported by n+1 horizontal rail sections. For example, a PV system 10 having two (2) rows of AC PV modules 14, 18 would be supported by three (3) rail sections. In one embodiment, rail system 20 includes five (5) support bars: a top rail section 24, a central rail section 26, a bottom rail section 28, a first grounding bar 30, and a second grounding bar 32. As shown in FIG. 3, first and second grounding bars or support bars 30, 32 are positioned in a perpendicular arrangement to rail sections 24, 26, 28. Fastener assemblies 34 mechanically and electrically couple first and second grounding bars 30, 32 to respective ends of rail sections 24, 26, 28, as described in additional detail below. L-brackets 36 mount rail sections 24, 26, 28 to mounting stanchions 38.

According to one embodiment, rail sections 24, 26, 28 and first and second grounding bars 30, 32 are constructed of an anodized metal, such as, for example, aluminum. In such an embodiment, fastener assemblies 34 include self-tapping screws or components constructed to break through the anodized surface of grounding bars 30, 32 during the assembly process in order to create an electrical connection between the base metal of grounding bars 30, 32 and the base metal of rail sections 24, 26, 28. First and second grounding bars 30, 32 thus act to electrically bond together the rail sections 24, 26, 28 at equipotential.

According to one embodiment, first and second grounding bar 30, 32 and rail sections 24, 26, 28 include predrilled holes for fastener assemblies 34 to ensure correct physical spacing between rail sections 24, 26, 28 and reduce installation errors.

Figure 4:
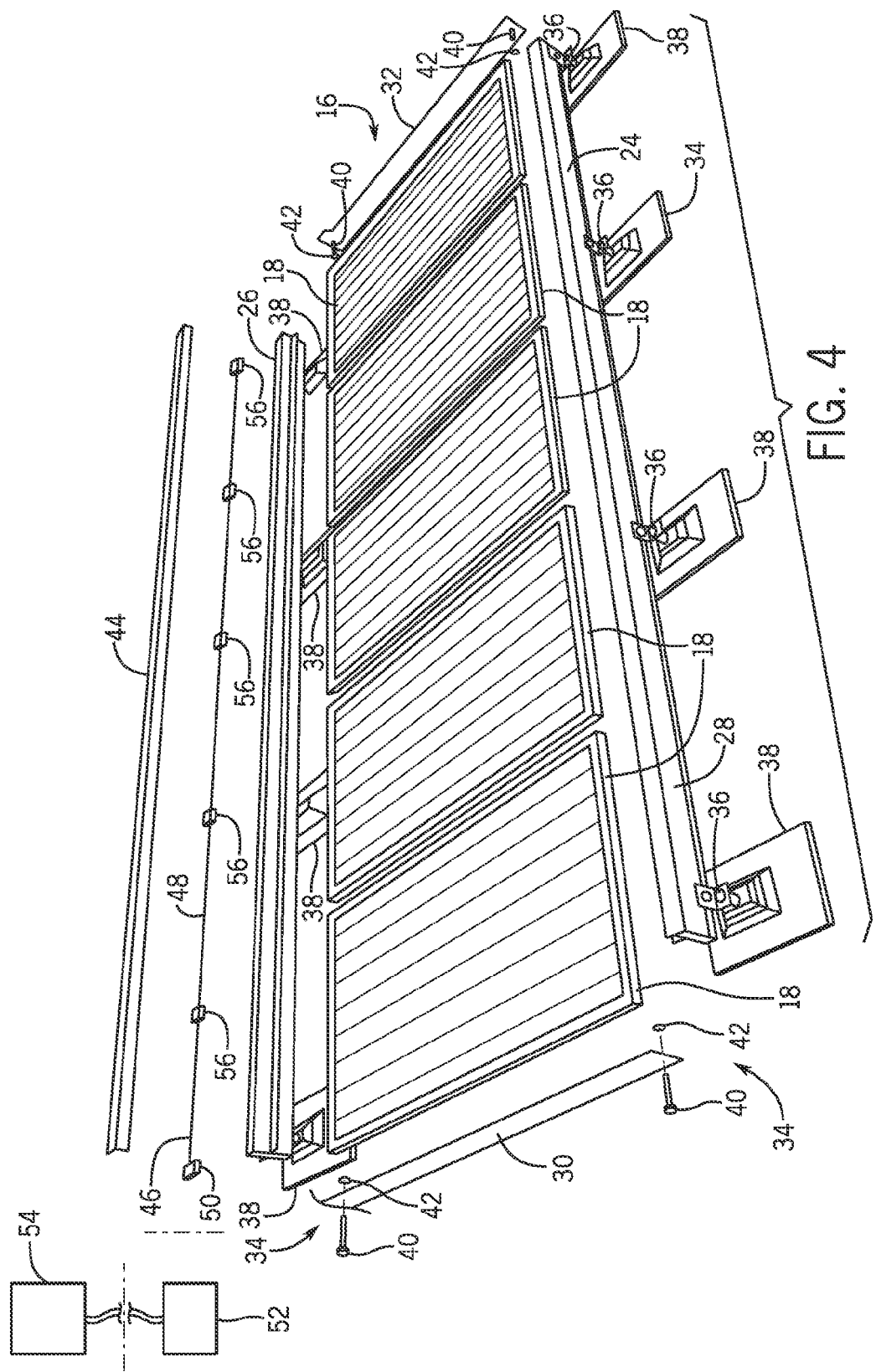
FIG. 4 is an exploded perspective view of a portion of the PV system shown in FIG. 3.

An exploded perspective view of a portion of PV system 10 associated with second row 16 of AC PV modules 18 is illustrated in FIG. 4. As shown, fastener assemblies 34 include respective pairs of fasteners 40 and star washers 42 that mechanically and electrically couple first and second grounding bars 30, 32 to top rail section 24 and bottom rail section 28 in one embodiment.

Central rail section 26 includes a rail cover 44, which is secured to central rail section 26 using known fasteners such as, for example, retention clips as described in detail in FIGS. 14-17, and an AC harness 46 positioned within central rail section 26 beneath rail cover 44. While AC harness 46 and rail cover 44 are illustrated as being associated with central rail section 26, AC harness 46 and rail cover 44 may, alternatively, be positioned along multiple sections of rail system 20 according to alternative embodiments.

AC harness 46 includes a wire assembly 48 electrically coupled to the output of AC PV modules 14, 18 and an end connector 50 coupleable to a connector box 52 for delivery to a load panel 54. The opposite end of AC harness 46 may include an end connector 198 (shown in FIGS. 14-16). A number of AC connectors 56 are positioned at fixed intervals along the length of AC harness 46 to interface with respective AC PV modules 14, 18, as described in more detail with respect to FIG. 13A-16.

Figure 17:
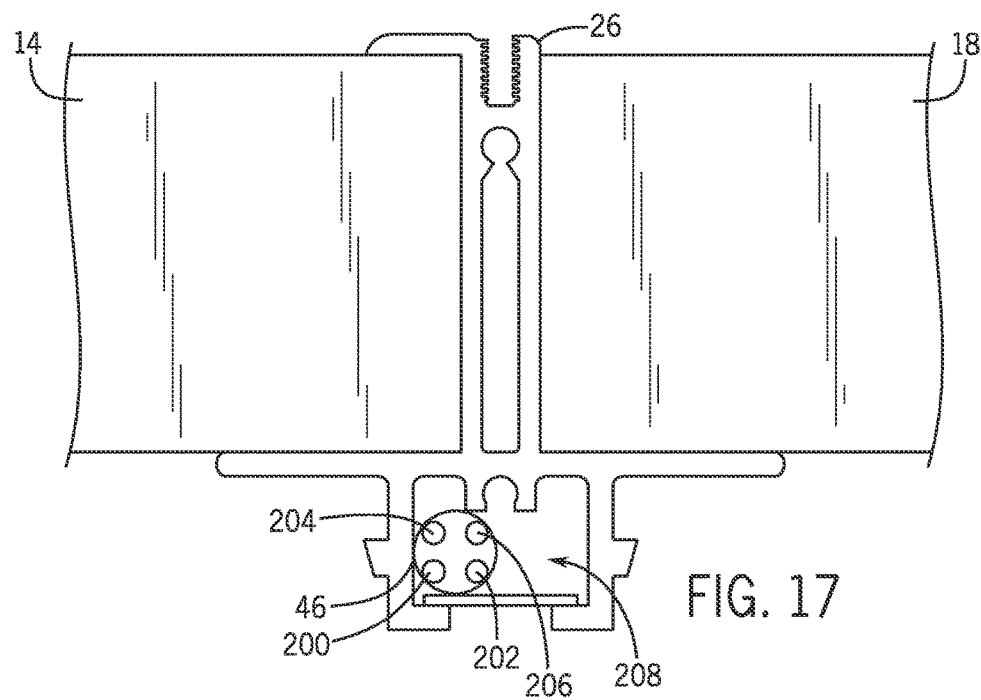
FIG. 17 is a cross-sectional view of a portion of the central rail section of the PV system of FIG. 3, according to an embodiment of the invention.

FIG. 5A is an exploded perspective view of the back or inactive side 58 of an AC PV module 60, designed to be used with PV system 10 shown in FIG. 3. AC PV module 60 includes a PV panel 62 and a micro-inverter assembly 64. The micro-inverter assembly 64 includes a circular DC connector 66 that is coupled or bonded to the inactive side 58 of PV panel 62 and is electrically coupled to a DC-to-AC micro-inverter 68. Both the DC connector 66 and the micro-inverter 68 are positioned within a micro-inverter housing 70. Housing 70 may include a housing cover 71 to allow access to the internal components of housing 70. In one embodiment housing cover 71 is aluminum, however, housing cover 71 may be manufactured of alternative metals or plastics in alternative embodiments. A micro-inverter AC wiring harness 72 contains a pair of AC lead wires, a ground lead wire, and a neutral lead wire (not shown for clarity). One skilled in the art will recognize that lead wires of micro-inverter AC harness 72 may be arranged in a similar manner as like-named lead wires 200, 202, 204, 206 of AC harness 46 as shown in FIG. 17. Micro-inverter AC harness 72 is electrically coupled to micro-inverter 68 and extends through housing 70. Fasteners 74 couple micro-inverter assembly 64 to PV panel frame 112. In one embodiment, fasteners 74 include a star washer that breaks through the anodized surface coating of PV panel frame 112 and electrically couples the frame 112 to the micro-inverter housing 70 to create a ground path therebetween.

DC connector 66 is positioned within an opening or recess 76 formed within a bottom surface 78 of housing 70. A circular DC connector 80 is coupled or bonded to the back side 58 of PV panel 62 and is constructed to mate with circular DC connector 66 of micro-inverter 68 within recess 76. DC connector 80 may be coupled to PV panel 62 using an adhesive such as silicon, as one example. In this embodiment, PV panel 62, DC connector 66, and micro-inverter 68 are electrically coupled together by way of electrical contacts and absent any wired connection between the components. Recess 76 is sized such that when housing 70 is coupled to AC PV module 60, panel DC connector 80 and micro-inverter DC connector 66 are concealed within recess 76 and protected from exposure to the external environment.

In an alternative embodiment, panel DC connector 80 is attached to the back/inactive surface 58 of PV panel 62 via a flexible ribbon cable (not shown) that protrudes out of the back side 58 of the PV panel 62. When housing 70 is coupled to AC PV module 60, after DC connectors 66, 80 are mated, DC connectors 66, 80 and the flexible ribbon cable are concealed within the recess 76 of housing 70, protected from exposure to the external environment, and are not accessible unless the micro-inverter assembly is disassembled from PV panel 62.

FIG. 5B provides a detailed view of panel DC connector 80. Panel DC connector 80 contains four (4) leads 82 of the panel bus, which allow for electrical coupling with micro-inverter DC connector 66. In an embodiment of the invention, leads 82 are made from copper or copper protected by a non-oxidizing coating; however, one having ordinary skill in the art would recognize that leads 82 could be made from other electrically conductive materials. Further, the number of leads 82 could be greater or less than four (4) in alternative embodiments.

DC connector 80 also contains a plurality of bypass diodes 84. Each bypass diode 84 is located between two (2) adjacent leads 82. When sections of panel 62 are not receiving a desired amount of solar irradiation, bypass diodes 84 effectively remove those sections from the overall circuit, thereby improving the overall system efficiency and reducing the possibility of shaded cells overheating. In an alternative embodiment of the invention, bypass diodes 84 are located between spring contacts 94 (FIG. 6) of DC connector 66. In yet another alternative embodiment of the invention, bypass diodes 84 are located within a circuit board 86 (FIG. 6) of micro-inverter 68.

Figure 5:
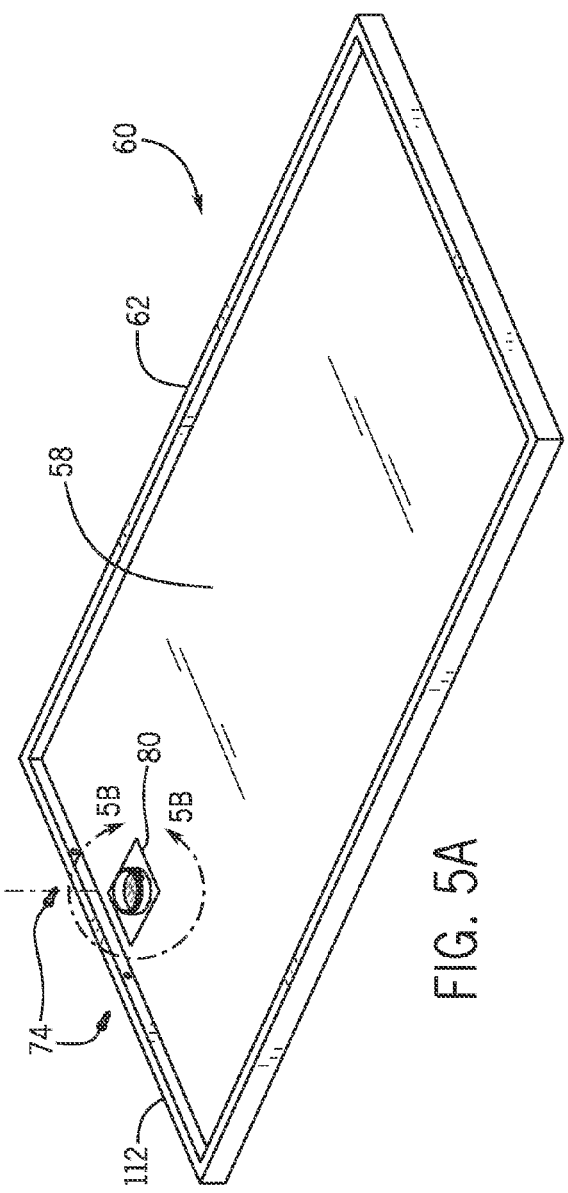
FIG. 5A is an exploded perspective view of the inactive side of an AC PV module suitable for use with the PV system shown in FIG. 3 according to an embodiment of the invention.
FIG. 5B is an enlarged version of portion 5B of FIG. 5A showing a detailed view of a DC connector coupled to the PV panel of the AC PV module.
Figure 6:
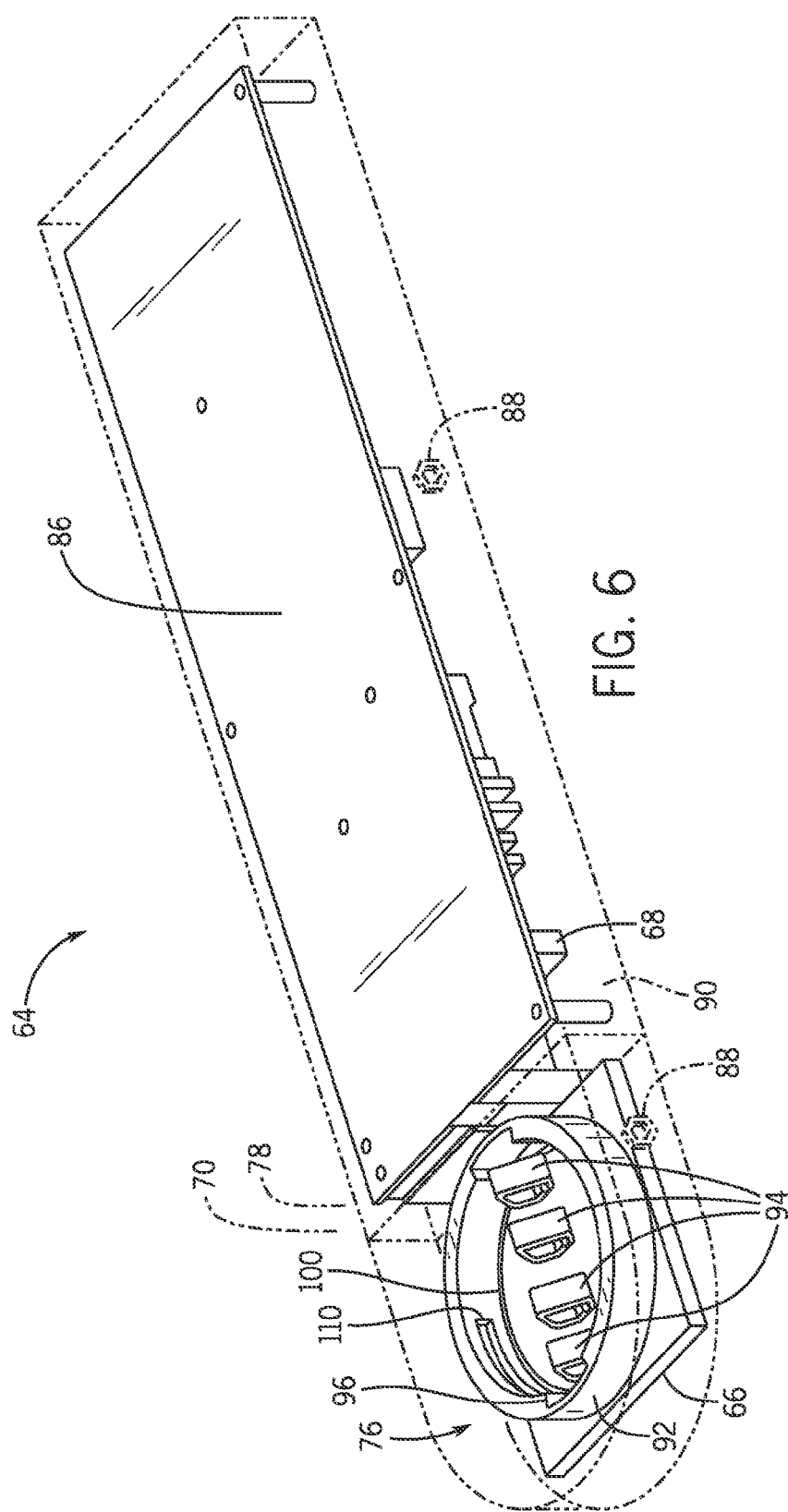
FIG. 6 is a perspective view of the bottom surface of the micro-inverter assembly in FIG. 3, according to an embodiment of the invention.

FIG. 6 is a perspective view of the bottom surface of micro-inverter assembly 64 of FIG. 5. Micro-inverter 68 is disposed within the housing 70 at a position adjacent opening 76. As shown, housing 70 includes optional threaded inserts 88 (shown in phantom) sized and positioned within a side surface 90 of housing 70 to receive fasteners 74 (FIG. 5A). Fasteners 74 may be a threaded screws or self-tapping screws that screw into the plastic housing 70. Micro-inverter DC connector 66 includes a circular housing 92 that contains exposed electrical contacts 94 arranged to electrical couple with leads 82 in panel DC connector 80 (FIG. 5B). In one embodiment electrical contacts 94 are copper spring contacts, however, electrical contacts 94 may be constructed of differing materials and/or of a different configuration. As one example, electrical contacts 94 of micro-inverter DC connector 66 may be configured as flat contacts, while leads 82 of panel DC connector 80 are flexible or spring contacts. In one embodiment of the invention, the electrical contacts of micro-inverter DC connector 66 are electrically coupled to micro-inverter 68 via lead wires (not shown).

Micro-inverter DC connector 66 also includes recesses 96 that mate with corresponding alignment tabs 98 in panel DC connector 80 (FIG. 5B). In an alternative embodiment, panel DC connector 80 is configured with recesses and micro-inverter DC connector 66 is configured with alignment tabs. DC connector 66 also includes a gasket or o-ring 100 that fits within a groove 102 of panel DC connector 80 to create a waterproof seal when DC connectors 66, 80 are engaged.

Figure 7:
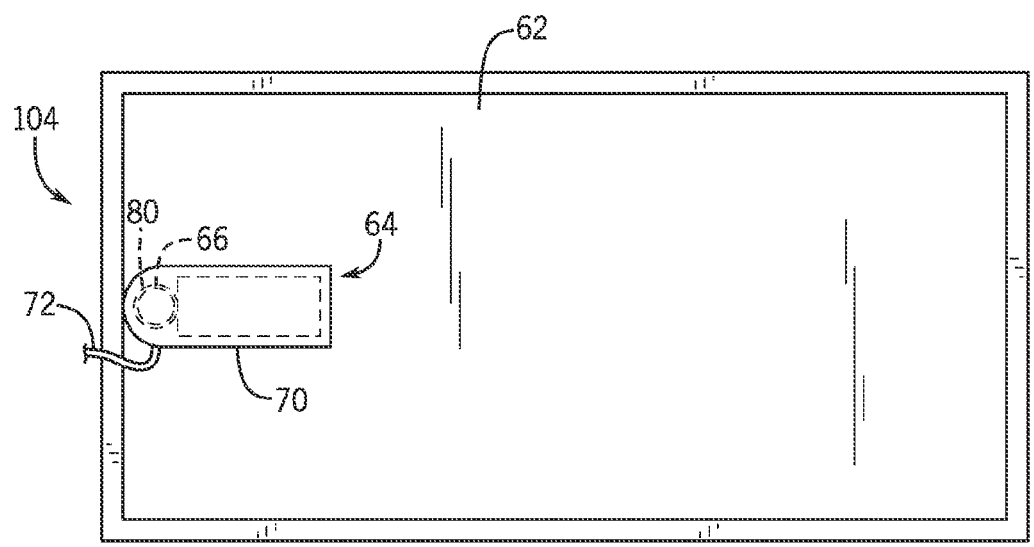
FIG. 7 is a schematic view of the components of the AC PV module of FIG. 5A illustrated in a first position during assembly of the AC PV module, according to an embodiment of the invention.
Figure 8:
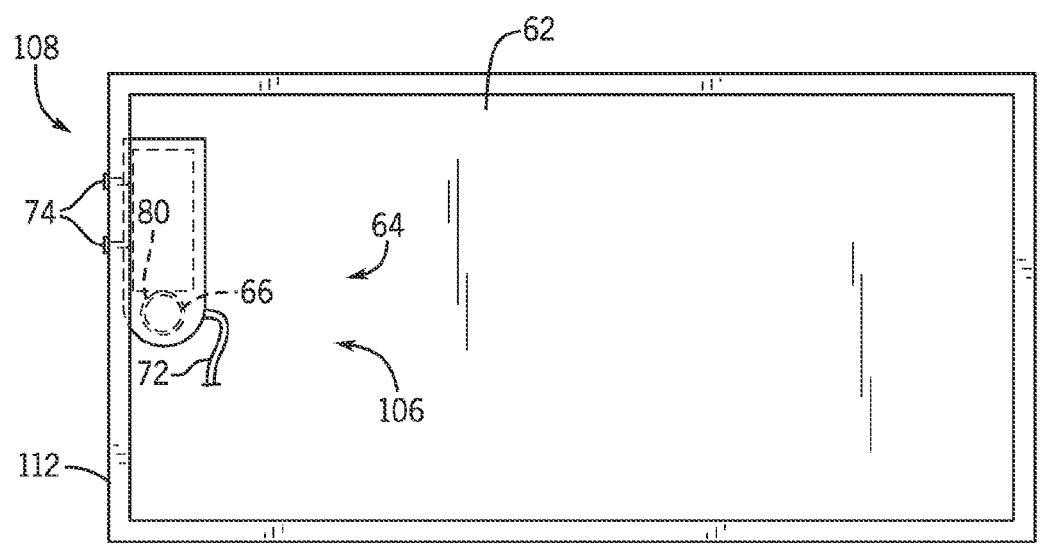
FIG. 8 is a schematic view of the components of the AC PV module of FIG. 5A illustrated in a second position during assembly of the AC PV module, according to an embodiment of the invention.

Referring now to FIGS. 7 and 8, schematic views of a two-step process of connecting micro-inverter assembly 64 to PV panel 62 are illustrated. As shown in FIG. 7, micro-inverter assembly 64 is placed on the back/inactive surface 58 of PV panel 62 in a first position 104 during a first step of the assembly process. In first position 104, micro-inverter DC connector 66 is aligned with panel DC connector 80 such that alignment tabs 98 of panel DC connector 80 are aligned with recesses 96 of micro-inverter DC connector 66, however, micro-inverter DC connector 66 remains electrically disconnected with panel DC connector 80.

In a second step of the assembly process, micro-inverter assembly 64 is moved in a rotational direction corresponding to arrow 106 to a second position 108, as illustrated in FIG. 8. As micro-inverter assembly 64 is rotated, alignment tabs 98 of panel DC connector 80 travel along an alignment slot 110 (FIG. 6) formed on the inside wall of micro-inverter DC connector 66. In one embodiment, alignment tabs 98 reach an end of the alignment slot 110 when micro-inverter assembly 64 reaches the second position 108. Alternatively, alignment slot 110 may be formed about the entire circumference of the micro-inverter DC connector 66. The rotation of micro-inverter assembly 64 from first position 104 to second position 108 causes electrical connections 94 within micro-inverter DC connector 66 to engage with electrical connections 82 within panel DC connector 80. Thus, in second position 108, micro-inverter assembly 64 and PV panel 62 are electrically coupled. Further, the mating of o-ring 100 of micro-inverter DC connector 66 and groove 102 of panel DC connector 80 form a waterproof seal between connectors 66, 80 in the second position 108.

In the embodiment illustrated in FIG. 8, micro-inverter assembly 64 is moved from the first position 104 to the second position 108 through a rotation of approximately 90 degrees in the counter-clockwise direction, however, alternative angles of rotation and directions of rotation are contemplated within the scope of the invention. Once micro-inverter assembly 64 is moved into second position 108, fasteners 74 may be used to mechanically couple micro-inverter assembly 64 to PV panel frame 112. In addition, fasteners 74 electrically ground micro-inverter assembly 64 to PV panel frame 112.

Figure 9:
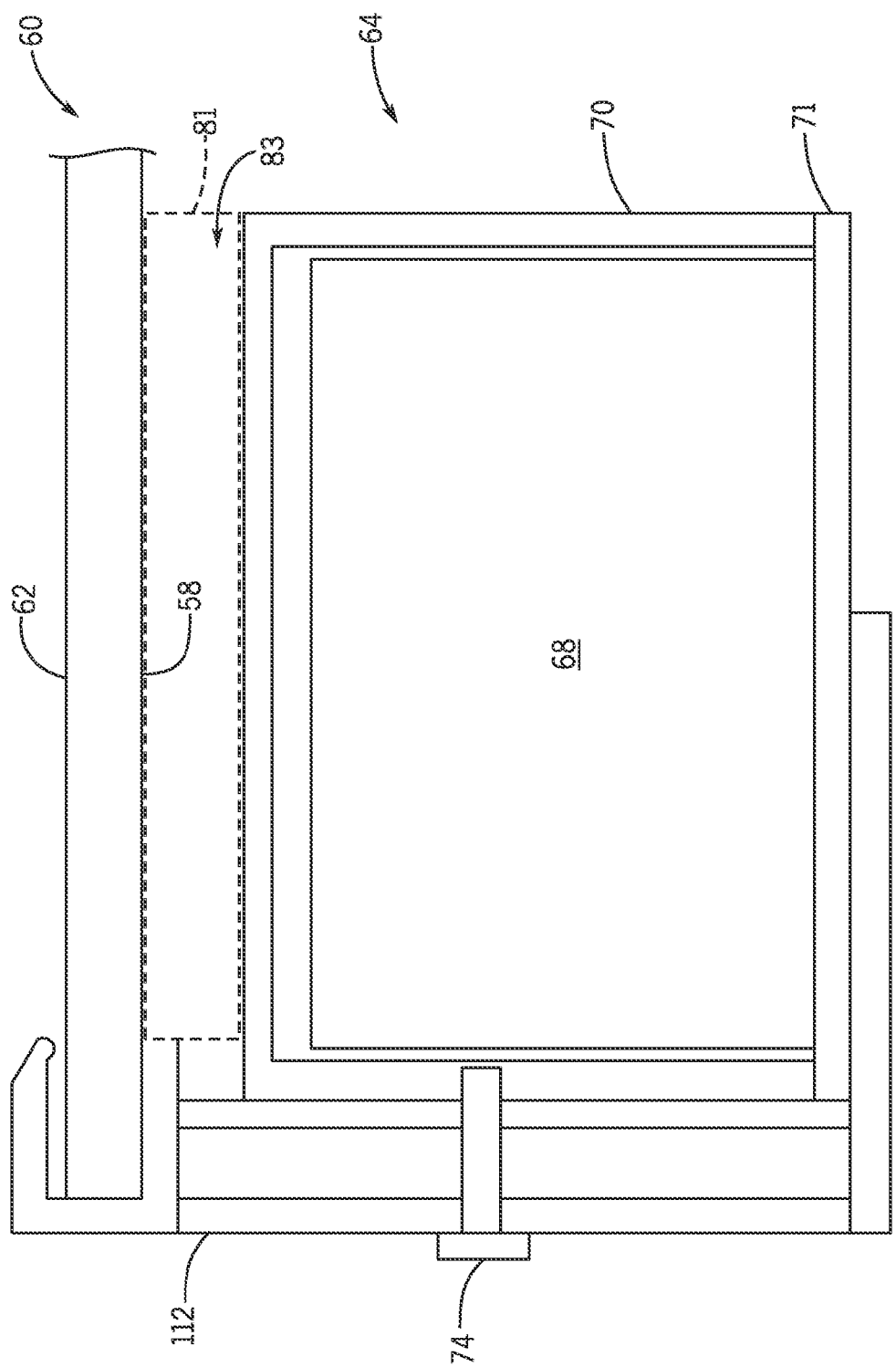
FIG. 9 is a cross-sectional view of a portion of the AC PV module of FIG. 5A.

FIG. 9 depicts a cross-sectional view of AC PV module 60. As shown, micro-inverter assembly 64 is secured to PV panel frame 112 via fasteners 74 as to create an air gap 83 between micro-inverter assembly 64 and the inactive side 58 of PV panel 62. Air gap 83 acts as a thermal barrier between PV panel 62 and micro-inverter assembly 64, which in turn assists with micro-inverter assembly 64 not overheating PV panel 62, and vice versa, and minimizes the thermal and mechanical stress put on PV panel 62 by micro-inverter assembly 64. In an alternative embodiment, an optional thermal barrier 81 (shown in phantom) may be attached to the backside 58 of PV panel 62 adjacent to DC connector 80. Thermal barrier 81 is positioned so as to have micro-inverter assembly 64 rest on thermal barrier 81. As a result, thermal barrier 81 assists with preventing micro-inverter assembly 64 from overheating PV panel 62, and vice versa. One having skill in the art would recognize that thermal barrier 81 could be made from an insulating material such as plastic.

Figure 10:
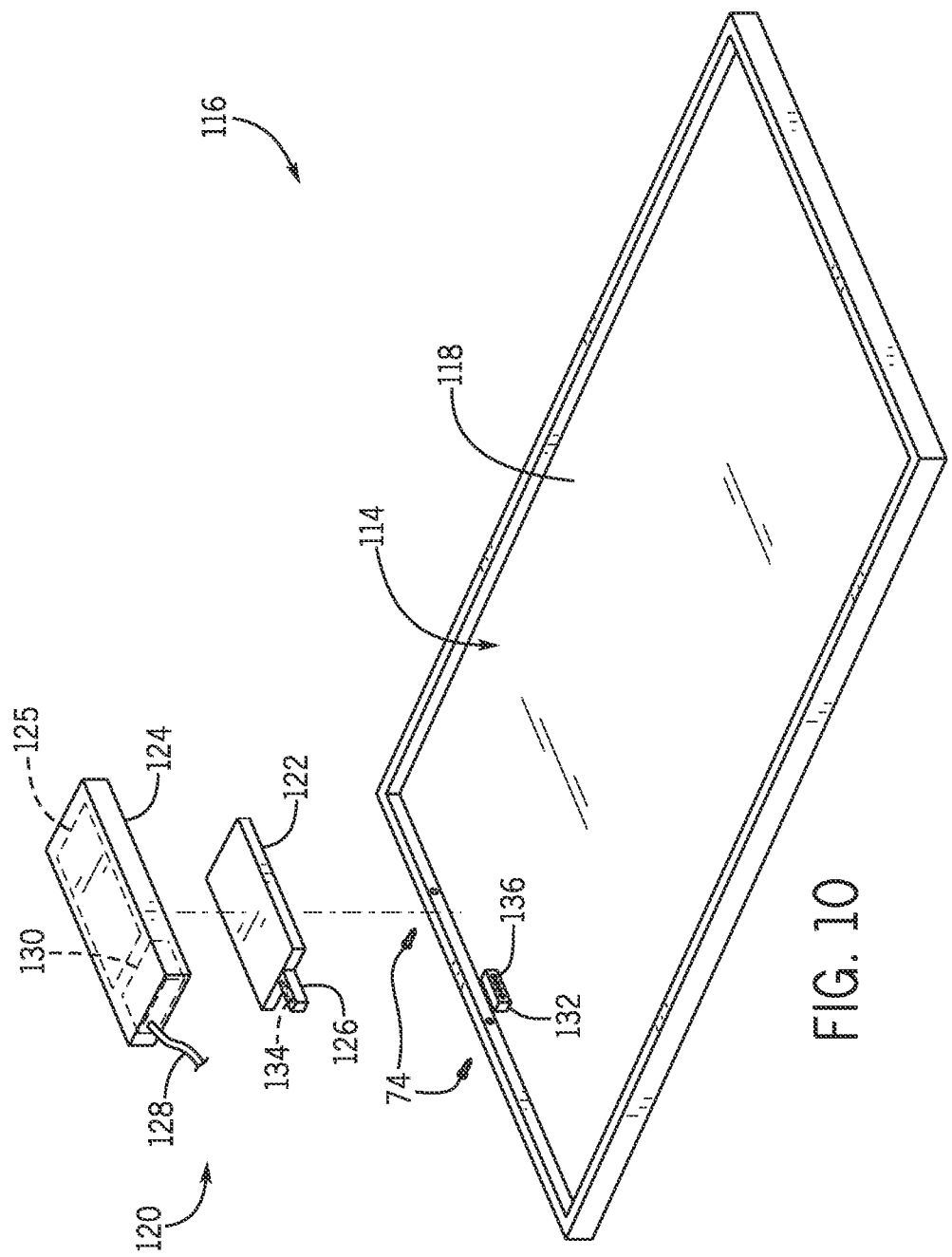
FIG. 10 is an exploded perspective view of the inactive side of an AC PV module suitable for use with the PV system shown in FIG. 3 according to an embodiment of the invention.

Referring now to FIG. 10, an exploded perspective view of the back or inactive side 114 of an AC PV module 116 designed to be used with PV system 10 (FIG. 3) is illustrated according to another embodiment of the invention. AC PV module 116 includes a PV panel 118 and a micro-inverter assembly 120, which includes a micro-inverter 122, a micro-inverter housing 124, and a micro-inverter DC connector 126. In one embodiment of the invention, micro-inverter housing 125 may include a housing cover 125. A micro-inverter AC harness 128 containing AC, ground, and neutral lead wires is electrically coupled to micro-inverter 122 and extends through housing 124. Micro-inverter 122 is positioned within housing 124 such that a DC connector 126 of micro-inverter 122 extends into an opening or recess 130 formed within housing 124. In one embodiment, DC connector 126 and micro-inverter DC connector 126 are positioned entirely within housing 124 such that when housing 124 is coupled to AC PV module 116, micro-inverter DC connector 126 and panel DC connector 126 are concealed within recess 130 housing 124 and protected from exposure to the external environment. DC connector 126 of micro-inverter 122 is constructed to interface with a DC connector 132 coupled to a back/inactive surface 114 of PV panel 118, as described in more detail with respect to FIGS. 11 and 12.

In one embodiment of the invention, micro-inverter DC connector 126 and panel DC connector 132 include mating slot and pin or plug-and-play connectors 134, 136 that electrically couple micro-inverter DC connector 126 and panel DC connector 132 absent a wired cable connection therebetween. It is contemplated that micro-inverter DC connector 126 and panel DC connector 132 are constructed having a male end and a female end, respectively, or vice versa. In an alternative embodiment, panel DC connector 132 is attached to the back/inactive surface 114 of PV panel 118 via a flexible ribbon cable (not shown) such that when housing 124 is coupled to AC PV module 116, after DC connectors 126, 132 are mated, DC connectors 126, 132 and the flexible ribbon cable are concealed within housing 124 and protected from exposure to the external environment.

Figure 11:
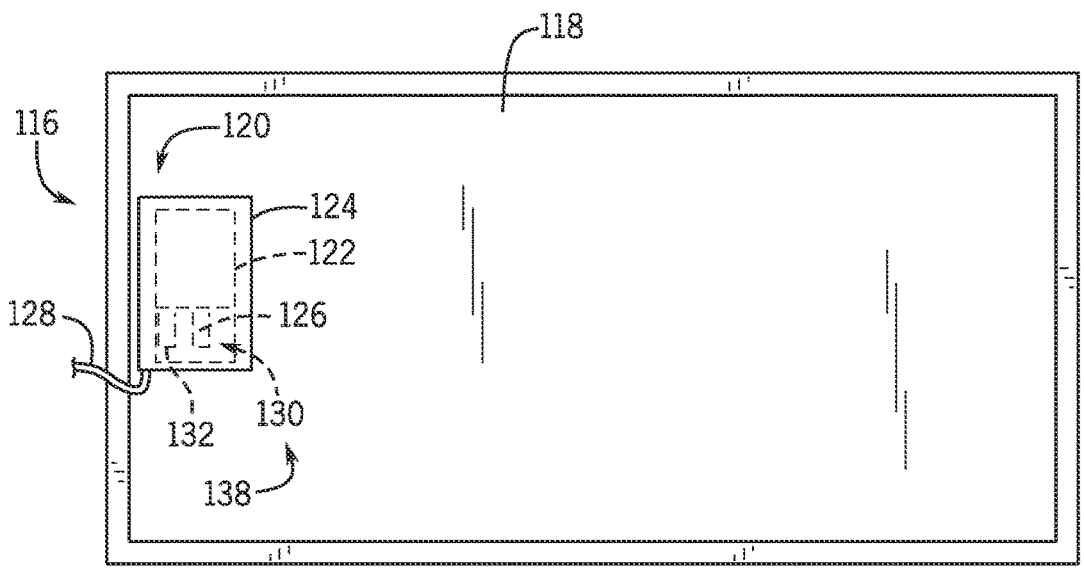
FIG. 11 is a schematic view of the components of the AC PV module of FIG. 10 illustrated in a first position during assembly of the AC PV module, according to an embodiment of the invention.
Figure 12:
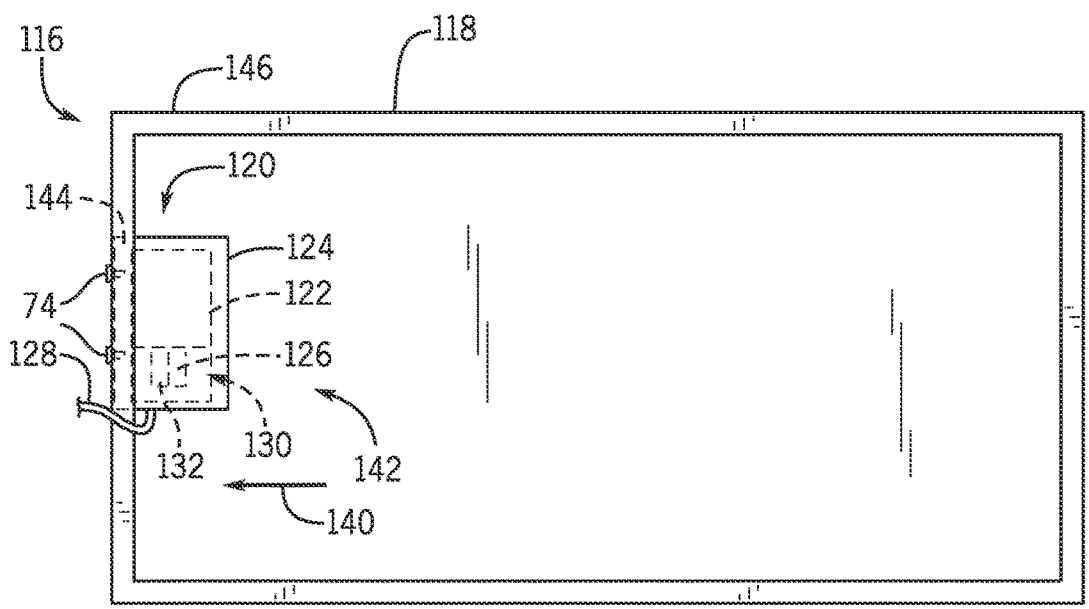
FIG. 12 is a schematic view of the components of the AC PV module of FIG. 10 in a second position during assembly of the AC PV module, according to an embodiment of the invention.

FIGS. 11 and 12 illustrate schematic views of a two-step process of connecting micro-inverter assembly 120 of FIG. 10 to PV panel 118. As depicted in FIG. 11, micro-inverter assembly 120 is initially placed on the back/inactive surface 114 of the PV panel 118 in a first position 138 in which DC connector 126 of micro-inverter assembly 120 remains electrically disengaged from DC connector 132 of PV panel 118. In one embodiment, micro-inverter assembly 120 is placed so as both panel DC connector 132 and micro-inverter DC connector 126 are located within recess 130 of housing 124.

As shown in FIG. 12, micro-inverter assembly 120 is next linearly translated in the direction of arrow 140 from first position 138 of FIG. 11 to a second position 142 during a second step of the assembly process. In second position 142, the slot and pin connectors 134, 136 (FIG. 10) of panel DC connector 132 and micro-inverter DC connector 126 are engaged, thereby electrically coupling micro-inverter assembly 120 and PV panel 62. According to one embodiment, a portion of housing 124 is positioned beneath a lip 144 of PV panel frame 146 when the micro-inverter assembly 120 is in the second position 142. Fasteners 74 mechanically couple micro-inverter assembly 120 and PV panel frame 146. In addition, fasteners 74 electrically ground micro-inverter assembly 120 to PV panel frame 146.

According to various embodiments of the invention, micro-inverter DC connector 126 is constructed in order to ensure a waterproof connection when electrically coupled with panel DC connector 132 in second position 142. In one embodiment, housing 124 includes a gasket or similar device (not shown) that creates a waterproof seal between the electrical connections within recess 130 and the external environment. Alternatively, housing 124 may be coupled to PV panel 118 with an adhesive to form a watertight seal there between.

The schematic views illustrating the two-step process of connecting micro-inverter assembly 64 to PV panel 62, as shown in FIGS. 7 and 8, and connecting micro-inverter assembly 120 to PV panel 118, as shown in FIGS. 11 and 12, demonstrate a two-step process for creating the electrical connection between the respective DC connector of the micro-inverter and respective DC connector of the PV panel. This two-step assembly technique utilizes the mated plug connector configuration of the DC connectors 66, 80, 126, and 132, reduces stresses put on DC connectors 66, 80, 126, and 132, and greatly simplifies DC connection of the micro-inverter to the PV panel as compared to the typical technique of hard-wiring connections. Further, because micro-inverter assemblies 64, 120 are secured to PV panels 62, 118 via fasteners, micro-inverter assemblies 64, 120 may be removed for on-site repairs.

In an alternative embodiment of the invention, the electrical connection between respective DC connector of the micro-inverter and respective DC connector of the PV panel can be achieved with flexible ribbon cables. In this embodiment of the invention, the respective DC connectors would be engaged by coupling the flexible ribbon cable of one DC connector to the flexible ribbon cable of the other ribbon cable and the flexible ribbon cables would be able to be stored within the recess of the micro-inverter housing.

Figure 13A:
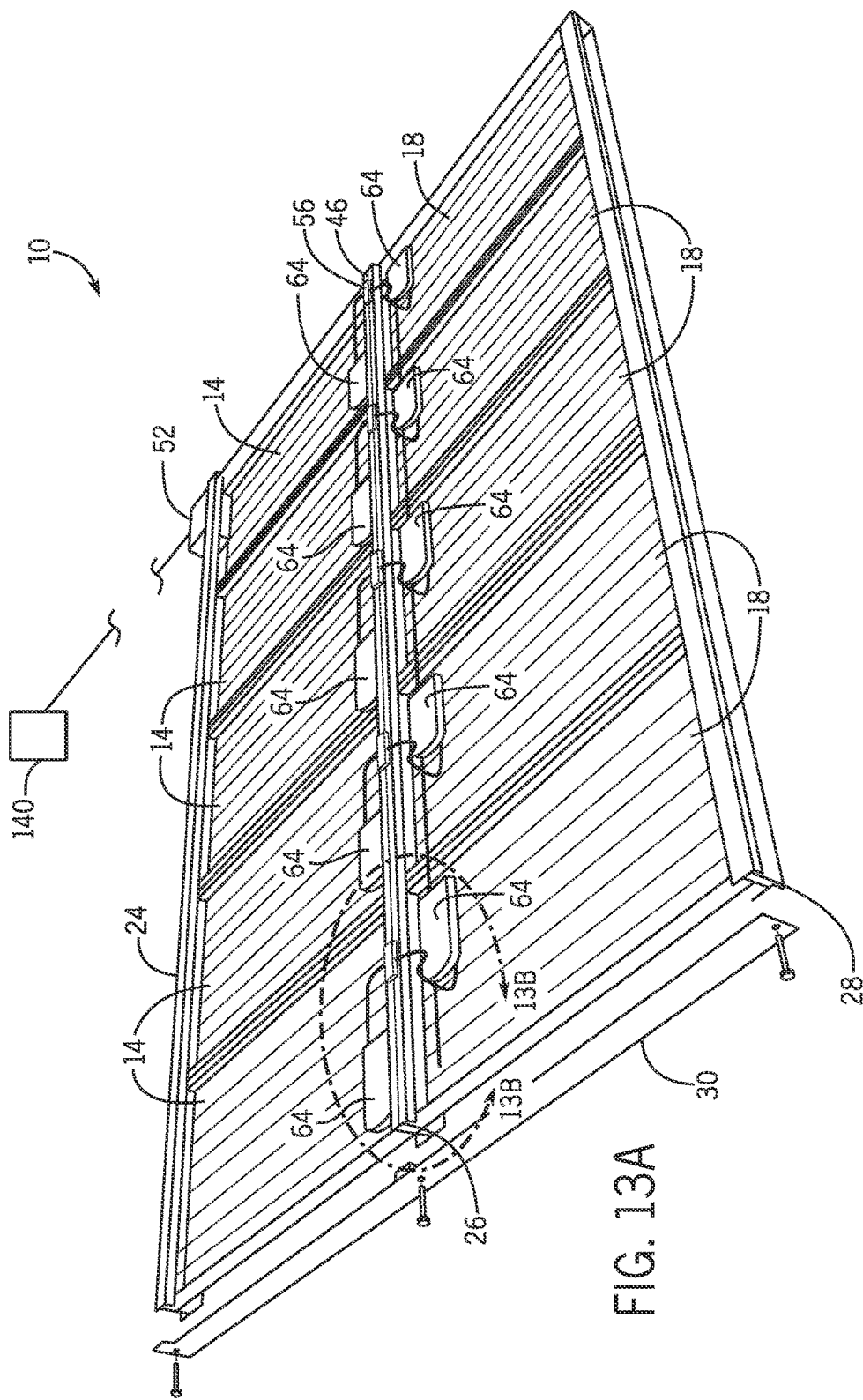
FIG. 13A is an exploded perspective view of the inactive or back side of the PV system of FIG. 3, according to an embodiment of the invention

FIG. 13A is a perspective view of the rear or inactive side of PV system 10 of FIG. 3 that illustrates the wired connections between respective micro-inverter assemblies 64 of the first row 12 and second row 16 of AC PV modules 14, 18, and AC harness 46. As illustrated in FIG. 13A, first row AC PV modules 14 and second row AC PV modules 18 are located on opposite sides along the length of central rail 26. AC harness 46 runs along the length of central rail 26. AC harness 46 includes AC connection modules 56, which are located along the length of AC harness 46 in positions correlating to respective AC PV modules 14, 18. Each AC connection module 56 is positioned to electrically couple AC harness 46 to a first row AC PV module 14 and a second row AC PV module 18.

Figure 13B:
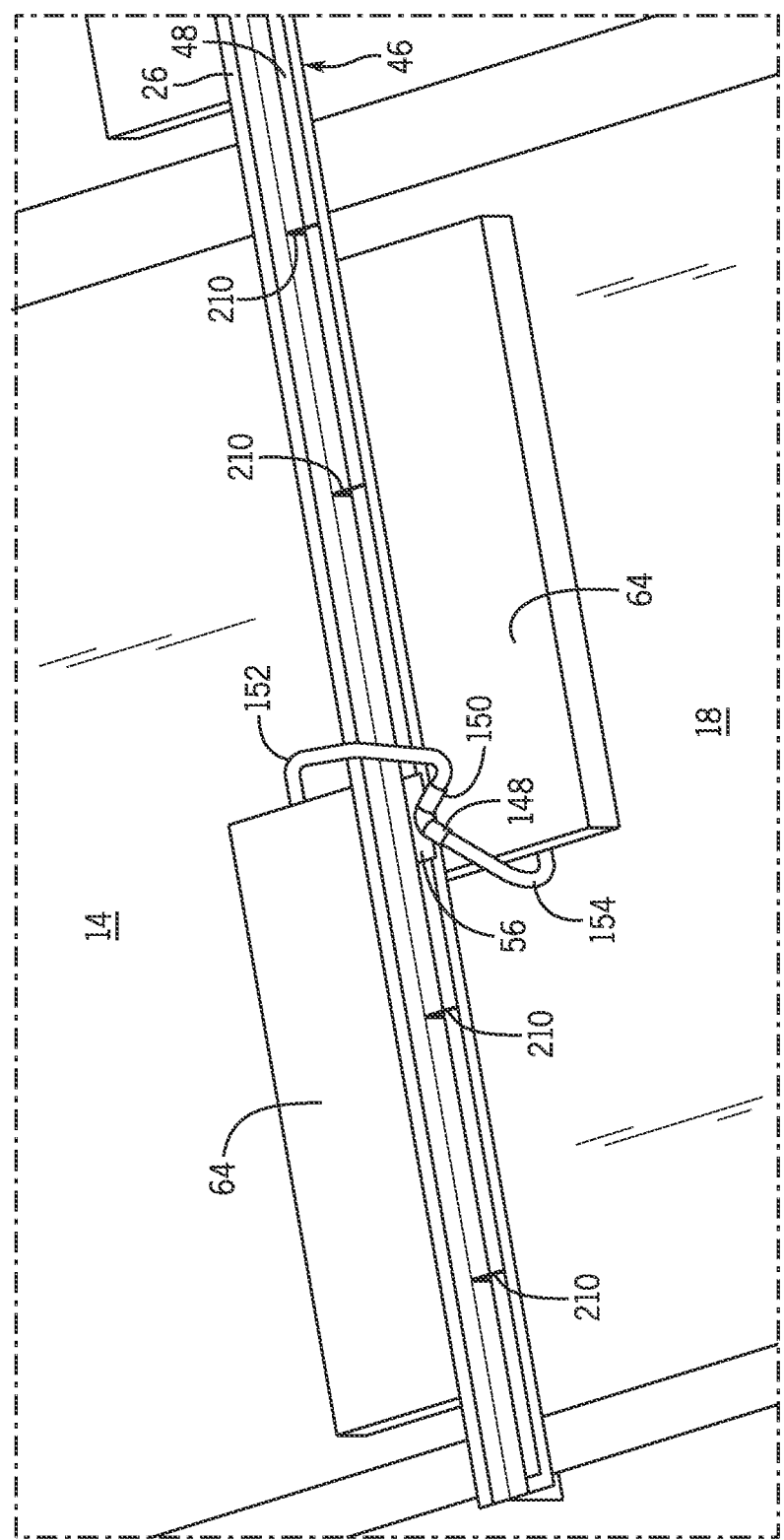
FIG. 13B is an enlarged view of portion 13B in FIG. 13A showing wired connections between an AC connector of an AC wire harness of the PV system, a micro-inverter assembly of an AC PV module in one row of AC PV modules, and a micro-inverter assembly of an AC PV module in another row of AC PV modules, according to an embodiment of the invention.

An enlarged view of portion 13B of FIG. 13A is provided in FIG. 13B to illustrate the connections between AC harness 46 and AC PV modules 14, 18 in additional detail. In the embodiment shown in FIG. 13B, AC connection module 56 is molded into the AC harness 46 at fixed intervals allowing two micro-inverters to connect to AC harness 46 at a single, fixed position. Each AC connection module 56 includes multiple AC terminals for electrically connecting wire assembly 48 of AC harness 46 to AC wiring harnesses of adjacent micro-inverters. In the embodiment shown, AC connection module 56 includes a first connection terminal 148 for coupling AC PV module 14 to AC harness 46 and a second connection terminal 150 for coupling AC PV module 18 to AC harness 46. Either or both of first and second terminals 148, 150 may be capped depending on the location of AC connection module 56 within the PV system. A first AC junction wire assembly 152 is used to couple AC connection module 56 with micro-inverter assembly 64 of AC PV module 14 and a second AC junction wire assembly 154 is used to couple AC connection module 56 with micro-inverter assembly 64 of AC PV module 18. In one embodiment, AC junction wire assemblies 152, 154 contain a pair of 120 V AC lead wires, a ground lead wire, and a neutral lead wire spliced to corresponding lead wires within wire assembly 48.

In the embodiment illustrated in FIG. 13B, AC connection module 56 is illustrated with connection terminals 148, 150 both being formed on the side of AC connection module 56 facing to AC PV module 18. As one skilled in the art will appreciate, however, the location and configuration of connection terminals 148, 150, may be varied in alternative embodiments based on various design specifications and system configurations.

In alternative embodiments, AC connection modules 56 may be designed as standalone components with multiple connection points for connections to individual sections of wire assembly 48 and micro-inverter AC harnesses 72, 128. As one example, one such AC connection module might include four connection points, with two opposing connection points configured to connect the AC connection module between two sections of the wire assembly and two additional connection points for connection to two micro-inverter AC harnesses. The AC connection modules may be provided with end caps permitting any of the connection points of the AC connection module to be terminated. Each connection point on the AC connection module may be constructed with pin or slot connections to facilitate connections between respective slot or pin connections of the wire assembly and micro-inverter AC harnesses. The use of this type of design of AC connection modules permits multiple sections of the AC harness to be spliced or strung together with AC connection modules either at the manufacturing site or during field installation, allowing many potential system configurations.

The embodiments described with respect to FIGS. 6-13B illustrate the micro-inverter AC harness 72, 128 being a direct, hard-wired connection to respective micro-inverters 68, 122 that is provided as part of micro-inverter assemblies 64, 120 and coupled to the AC harness 46 after the micro-inverter 68, 122 is installed on PV panels 62, 118. In alternative embodiments, the micro-inverter AC harness 72, 128 is provided as part of AC harness 46 and electrically coupled to micro-inverter 68, 122 following installation of micro-inverter assembly 64, 120 on PV panel 62, 118 and assembly of PV panel 62, 118 within rail system 20 (FIG. 3).

In addition, while AC harness 46 and AC PV modules 14, 18 are illustrated in FIG. 13B as being connected via direct hard-wired connections between AC connection module 56 and micro-inverter assemblies 120, AC electrical connections between AC harness 46 and respective AC outputs of micro-inverters 68, 122 may be made in a number of alternative manners. In addition, the AC connections may be made using various combinations of plug-and-play connectors and/or hard wired connections, as described with respect to the embodiments illustrated in FIGS. 14-16.

Figure 14:
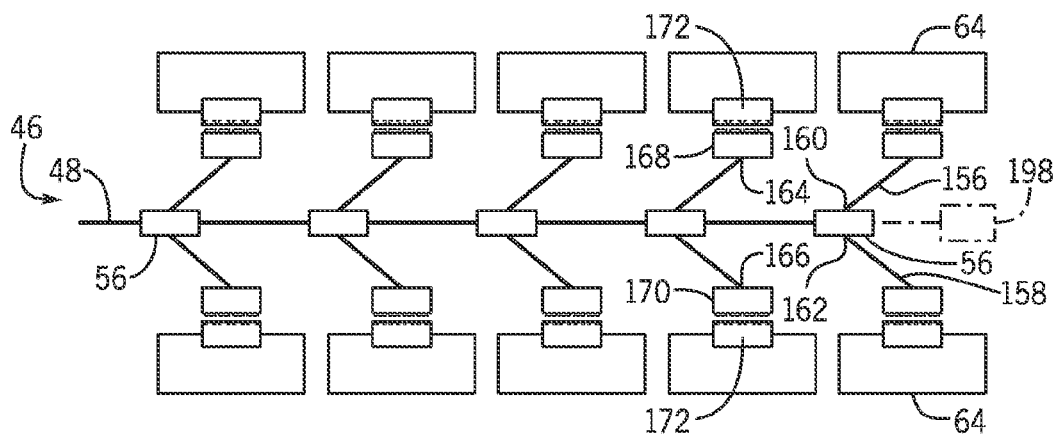
FIGS. 14-16 are schematic views of electrical connections between the AC wire harness and micro-inverters of the PV system of FIG. 3, according to alternative embodiments of the invention.

Referring first to FIG. 14, a schematic view of an alternative embodiment used to electrically connect micro-inverter assemblies 64 to wire assembly 48 is shown. In the embodiment shown, each AC connection module 56 includes a first AC connection wire assembly 156 and a second AC connection wire assembly 158 coupled thereto. First and second AC connection wire assemblies 156, 158 include a pair of AC lead wires, a ground lead wire, and a neutral lead wire, similar to that described with respect to AC junction wire assemblies 152, 154 of FIG. 13B. A first end 160, 162 of each AC connection wire assembly 156, 158 is directly wired to corresponding lead wires of wire assembly 48 within AC connection module 56. Second ends 164, 166 of each AC connection wire assembly 156, 158 are coupled to respective AC junction connectors 168, 170, constructed to engage with corresponding module connectors 172 coupled to micro-inverter assemblies 64. Module connectors 172 may be integrated within housing 70 (FIG. 5) of micro-inverter assemblies 64 or coupled to housing 70 in alternative embodiments. While FIG. 14 illustrates AC junction connectors 168, 170 as plug-and-play connectors having male connections and module connectors 172 as plug-and-play connectors having female connections, one having ordinary skill in the art will recognize that AC junction connectors 168, 170 and module connectors 172 may be constructed as plug-and-play connectors having male connections and female connections, respectively.

Figure 15:
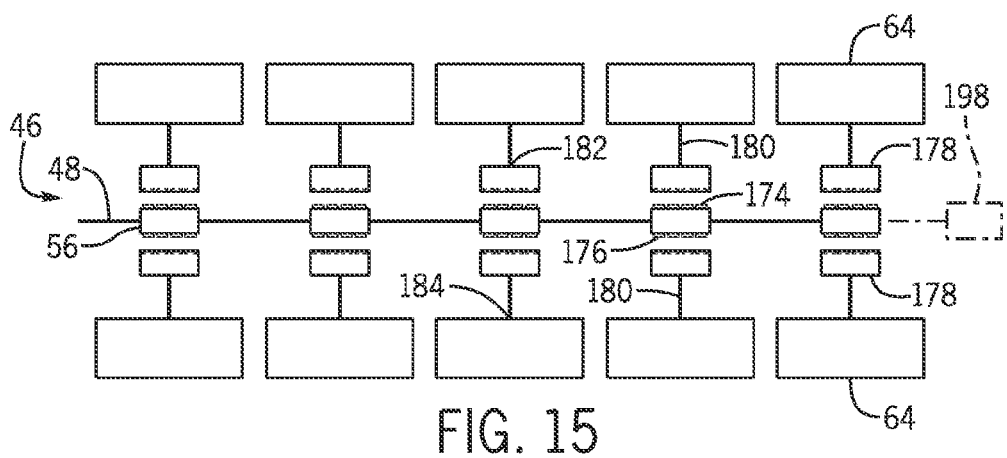

FIG. 15 depicts a schematic view of an alternative embodiment used to electrically connect micro-inverter assemblies 64 to wire assembly 48. In this embodiment, first and second AC terminal connectors 174, 176 are integrated within each AC connection module 56 and are constructed to engage with AC connectors 178, which are electrically coupled to a respective micro-inverter 64 via an AC wire harness 180. AC wire harness 180 includes a pair of AC lead wires, a ground lead wire, and a neutral lead wire, similar to that described to AC junction wire assembly 152, 154 of FIG. 13B. AC connectors 178 are coupled to first ends 182 of AC wire harnesses 180. Second ends 184 of the AC wire assemblies 180 are directly hard wired to their respective micro-inverter assemblies 64. While FIG. 15 shows connectors 174, 176 as plug-and-play connectors having male connections and connectors 178 as plug-and-play connectors having female connections, connectors 174, 176 and connector 178 can be constructed as plug-and-play connectors having male connections and female connections, respectively.

Figure 16:
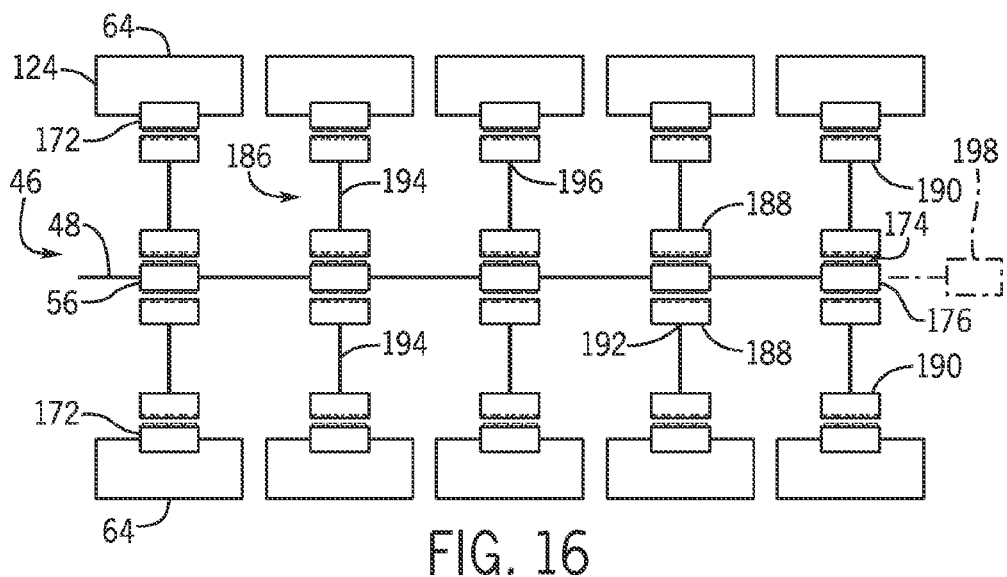

FIG. 16 depicts a schematic view of yet another embodiment used to electrically connect micro-inverter assemblies 64 to wire assembly 48. In the embodiment shown, first and second AC terminal connectors 174, 176 are integrated within each AC connection module 56 similar to FIG. 15. In this embodiment, module connectors 172 are integrated within or coupled to housing 124 of micro-inverter assemblies 64. A dual-connector AC harness assembly 186 is provided to electrically connect module connectors 172 with AC terminal connectors 174, 176. Each dual-connector AC harness assembly 186 includes a first harness connector 188 and a second harness connector 190. First harness connector 188 is coupled to a first end 192 of an AC connection wire 194 of dual-connector AC harness assembly 186, and second harness connector 190 is coupled to a second end 196 of AC connection wire 194. One having ordinary skill in the art will recognize that connectors 172, 174, 176, 188, 190 may be constructed in alternative combinations of plug-and-play connectors having male connections and female connections than those illustrated in FIG. 16 within the scope of the invention.

Referring to FIGS. 14-16 together, according to some embodiments, AC wire harness 46 includes an optional end cap 198 (shown in phantom) that forms a termination point of AC harness 46 adjacent to the last AC connection module 56 located along the length of AC harness 46. Alternatively, the end cap 198 may be integrated within the last AC connection module 56 located along AC harness 46 thereby forming a termination point of AC wiring harness 46 within AC connection module 56. The use of optional end cap 198 permits AC harness 46 to be manufactured as a large continuous roll of wire with AC connection modules 56 positioned at fixed intervals along the length of the wire assembly 48. During on-site installation or when preparing factory orders for shipment, the roll of wire would be cut to a desired length and an end cap 198 and end connector 50 could be installed on opposing ends of the cut wire to form an AC harness.

Although FIGS. 13A, 13B, and 14-16 have been described as using micro-inverter assembly 64, the embodiments described there in are equally applicable to micro-inverter assembly 120 of FIG. 10.

Figure 18:
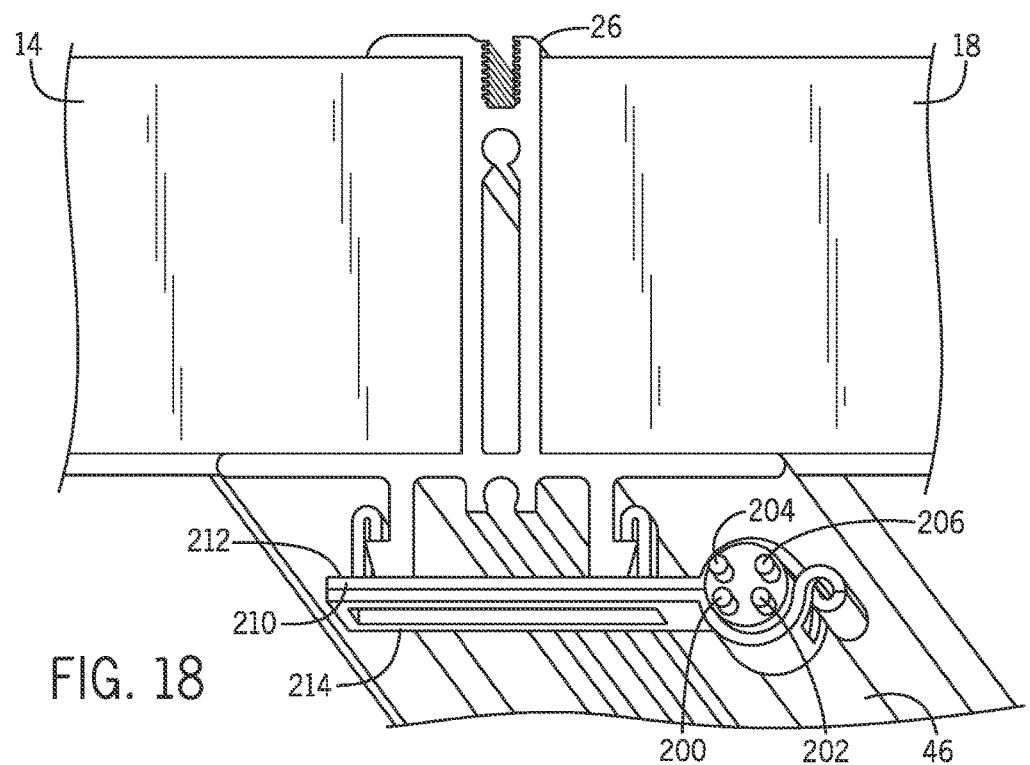
FIG. 18 is a cross-sectional view of a portion of the central rail section of the PV system of FIG. 3, according to another embodiment of the invention.
Figure 19:
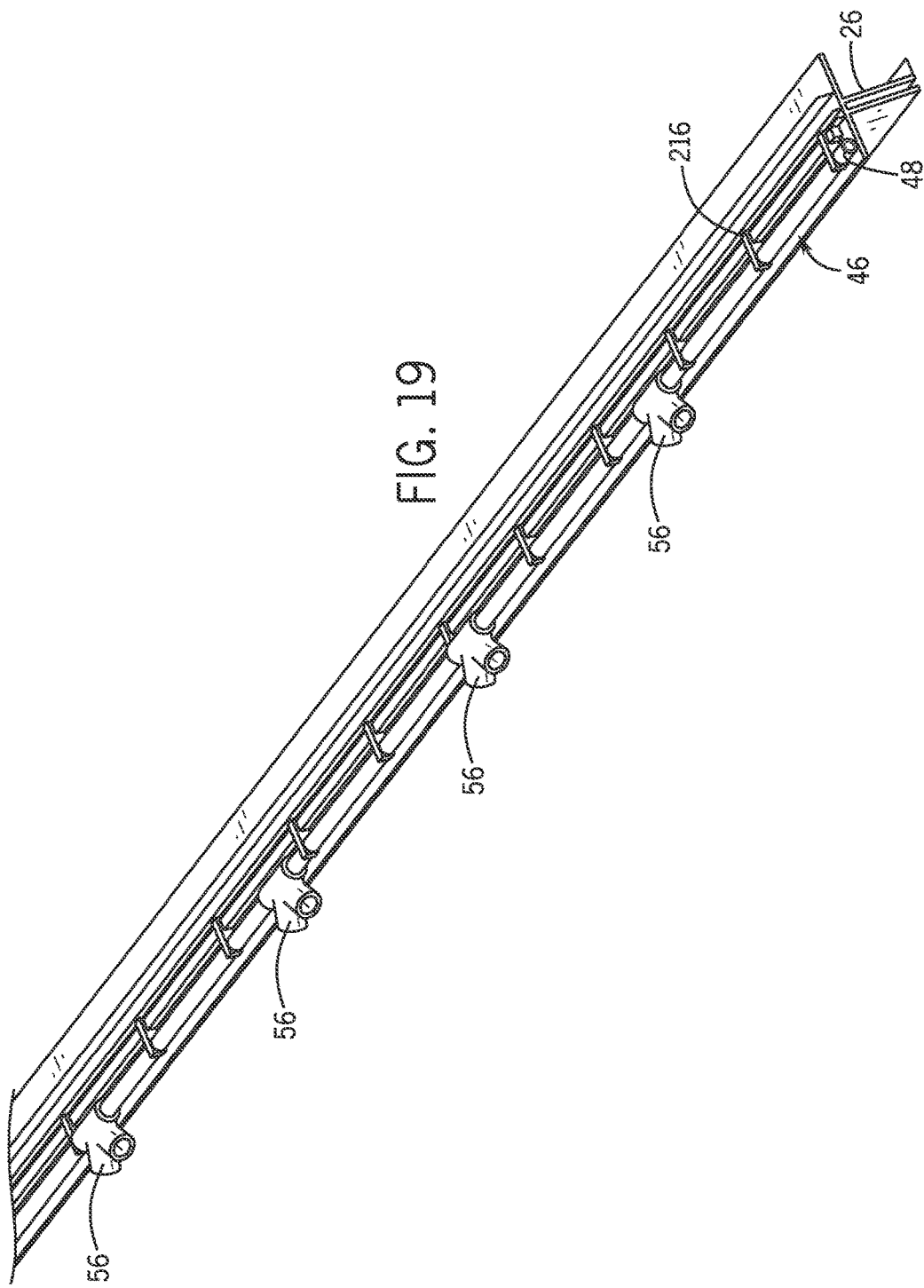
FIG. 19 is a perspective view of a portion of the central rail section of the PV system of FIG. 3, according to another embodiment of the invention.

FIGS. 17-19 illustrate alternative embodiments for securing AC harness 46 to central rail section 26. As shown in both Figures, AC harness 46 includes a pair of AC lead wires 200, 202, a neutral lead wire 204, and a ground lead wire 206. As depicted in FIG. 17, according to one embodiment, AC harness 46 runs along a cavity 208 formed within rail 26.

In an alternative embodiment shown in FIG. 18, AC harness 46 is secured to rail 26 by retention clips 210 positioned along the length of AC harness 46. The retention clip 210 illustrated in FIG. 18 includes an upper portion 212 and a lower portion 214 that clip together to secure AC harness 46 to the underside of rail 26. In an alternative embodiment shown in FIG. 19, retention clips 216 may formed as a one piece mold part and positioned at fixed intervals along the length of one side of rail 26, with adjacent clips 216 positioned on either side of each AC connection modules 56. Retention clips 216 may be formed of a plastic or metal material. As shown in FIG. 19, AC connection modules 56 are positioned in recesses 218 formed within rail 26.

In any of the embodiments described with respect to FIGS. 17-19, AC junction wire assemblies 152, 154 (FIG. 13B) may extend through optional openings or recesses, such as recesses 218 of FIG. 19 formed in rail 26 or rail cover (44 of FIG. 4) at locations corresponding to each AC connection module 56 to permit connection between AC connection modules 56 and micro-inverter assemblies 120 of each AC PV module 14, 18.

In the embodiments set forth above, a single AC harness 46 is used to electrically connect the outputs of AC PV modules in the first row 12 and second row 16 of FIG. 3, with dual-input connectors positioned along the length of the AC harness to connect to pairs of opposing AC PV modules in the first and second row 12, 16.

In summary, PV panel DC connectors, micro-inverter DC connectors, and various configurations of connectors between the AC harness and micro-inverters provide for improved DC and AC connections within individual AC PV modules and the overall PV system. The resulting system design facilitates on-site installation and repairs and reduces system costs. Further, the AC wire harness disclosed herein reduces the effective length of cable used to electrically connect the same amount of AC PV modules by approximately 50%, which results in the ability to increase the capacity of AC PV modules for a single AC wire harness.

Therefore, according to one embodiment of the invention, a micro-inverter assembly includes a housing having an opening formed in a bottom surface thereof, and a direct current (DC)-to-alternating current (AC) micro-inverter disposed within the housing at a position adjacent to the opening. The micro-inverter assembly further includes a micro-inverter DC connector electrically coupled to the DC-to-AC micro-inverter and positioned within the opening of the housing, the micro-inverter DC connector having a plurality of exposed electrical contacts.

According to another aspect of the invention, a method of assembling a photovoltaic (PV) module includes providing a PV panel and coupling a first direct current (DC) connector to a bottom surface of the PV panel, the first DC connector having a plurality of leads electrically coupled to the PV panel. The method further includes providing a micro-inverter assembly, the micro-inverter assembly having a micro-inverter positioned within a housing and a second DC connector electrically coupled to the micro-inverter and positioned within a recess formed in a bottom surface of the housing. In addition, the method includes positioning the bottom surface of the housing on the bottom surface of the PV panel at a first position, wherein the first DC connector is positioned within the recess, and moving the housing from the first position to a second position, wherein movement from the first position to the second position causes the first DC connector to engage the second DC connector.

According to yet another aspect of the invention, a photovoltaic (PV) module assembly includes a PV panel, a panel direct current (DC) connector coupled to an inactive side of the PV panel, and a micro-inverter assembly. The micro-inverter assembly includes a housing, a micro-inverter disposed within the housing, and a micro-inverter DC connector positioned within the housing and coupled to the micro-inverter. Further, the panel DC connector and the micro-inverter DC connector have mating connectors disposed within a recess formed in the housing.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A photovoltaic (PV) module assembly comprising:
   a PV panel;
   a panel direct current (DC) connector coupled to an inactive side of the PV panel; and
   a micro-inverter assembly comprising:
      a housing;
      a DC-to-alternating current (AC) micro-inverter disposed within the housing adjacent a recess formed in the housing; and
      a micro-inverter DC connector comprising a plurality of exposed electrical contacts positioned within the housing and coupled to the micro-inverter; and
   wherein the panel DC connector and the micro-inverter DC connector comprise mating connectors disposed within the recess formed in the housing.

2. The assembly of claim 1 further comprising a plurality of blocking diodes coupled between a plurality of spring contacts of the micro-inverter DC connector.

3. The assembly of claim 1 wherein panel DC connector comprises:
   a plurality of leads formed on an internal surface of the panel DC connector; and
   a plurality of blocking diodes coupled between the plurality of leads.

4. The assembly of claim 3 wherein the micro-inverter DC connector comprises a plurality of spring contacts positioned to engage the plurality of leads of the panel DC connector.

5. The assembly of claim 1 wherein the panel DC connector is coupled to the inactive side of the PV panel with an adhesive.

6. The assembly of claim 1 wherein the micro-inverter DC connector comprises a first plug-and-play connector having one of female connections and male connectors and the panel DC connector comprises a second plug-and-play connector having the other of male connections and female connections.

7. The assembly of claim 1 further comprising a plurality of fasteners coupling a frame of the PV panel to the housing of the micro-inverter; and
   wherein a portion of the housing of the micro-inverter is positioned beneath a lip formed in the frame of the PV panel.

8. The assembly of claim 7 wherein the plurality of fasteners electrically grounds the frame of the PV panel and the housing of the micro-inverter.

9. The assembly of claim 1 further comprising a gasket positioned between the micro-inverter DC connector and the panel DC connector to form a watertight connection therebetween.

* * * * *